(12) United States Patent
Akiyama et al.

(10) Patent No.: US 6,934,243 B2
(45) Date of Patent: Aug. 23, 2005

(54) OPTICAL INFORMATION RECORDING MEDIUM, RECORDING/REPRODUCING APPARATUS AND RECORDING/REPRODUCING METHOD FOR THE SAME, AND METHOD FOR MANUFACTURING OPTICAL INFORMATION RECORDING MEDIUM

(75) Inventors: Tetsuya Akiyama, Hirakata (JP); Kenichi Nishiuchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 347 days.

(21) Appl. No.: 10/384,205

(22) Filed: Mar. 7, 2003

(65) Prior Publication Data

US 2003/0185122 A1 Oct. 2, 2003

(30) Foreign Application Priority Data

Mar. 29, 2002 (JP) ........................................ 2002-096450

(51) Int. Cl.[7] ................................................. G11B 7/00
(52) U.S. Cl. .................. 369/275.3; 369/116; 369/47.53
(58) Field of Search .......................... 369/275.3, 275.1, 369/275.2, 47.5, 116, 47.51, 47.53

(56) References Cited

U.S. PATENT DOCUMENTS 5,526,341 A * 6/1996 Shiba et al. ............. 369/275.1

FOREIGN PATENT DOCUMENTS

JP            4-19837           1/1992

* cited by examiner

*Primary Examiner*—Nabil Hindi
(74) *Attorney, Agent, or Firm*—Hamre, Schumann Mueller & Larson P.C.

(57) ABSTRACT

An optical information recording medium includes: a substantially disk-shaped substrate; and a recording layer formed on a surface of the substrate for recording, reproducing and erasing information by irradiation with a laser beam. A test recording region for test recording and an information recording region for recording the information at least are arranged on the surface of the substrate. In the test recording region and the information recording region arranged on the surface of the substrate, a test recording track and an information recording track respectively are formed in a spiral-shaped arrangement or in a concentric arrangement. A track pitch of the test recording track is wider than a track pitch of the information recording track.

32 Claims, 14 Drawing Sheets

OPTICAL INFORMATION RECORDING MEDIUM, RECORDING/REPRODUCING APPARATUS AND RECORDING /REPRODUCING METHOD FOR THE SAME, AND METHOD FOR MANUFACTURING OPTICAL INFORMATION RECORDING MEDIUM

BACKGROUND OF THE INVENTION

1. Field of the Invention

The present invention relates to an optical information recording medium with a recording layer in which information is recorded/reproduced by the irradiation of laser light or the like, and relates to a recording/reproducing apparatus and a recording/reproducing method for the same, and a method for manufacturing an optical information recording medium.

2. Related Background Art

Attention is being given to an optical recording medium as a large-capacity and high-density memory, and a so-called erasable type capable of rewriting currently is being developed. Such erasable type optical information recording media include one in which a thin film whose phase is changed between an amorphous state and a crystal state is formed as a recording layer on a substrate, whereby information is recorded and erased by means of thermal energy by the irradiation of laser light.

As a phase-changing material constituting this recording layer, an alloy film containing Ge, Sb, Te, In and the like as a main component, e.g., a GeSbTe alloy is known. In general, the recording of information is carried out through the formation of a mark by changing the recording film partially to amorphous, whereas the erasing of information is carried out by changing the thus formed amorphous mark to crystalline.

Changing a recording layer to amorphous is carried out by heating the recording layer at a melting point or higher, followed by cooling at a rate of a predetermined value or more. On the other hand, changing the recording layer to crystalline is carried out by heating the recording layer at a temperature in a range from a crystallization point to a melting point, inclusive.

Information recorded on the recording layer is reproduced by utilizing a difference in reflectance between the amorphous mark and the crystal region. To this end, the recording layer generally is configured so that the reflectance in an amorphous state becomes lower than that in a crystal state.

Also, in general, a spiral-shaped or concentric guide groove is formed on a substrate beforehand for the purpose of tracking by laser light. A region between the grooves is called a land, and in a general configuration only one of the groove and the land is allocated to an information track for recording information and the other one is allocated to a guard band for separating adjacent information tracks from each other. This method is adopted for a recordable CD (CD-R) and a minidisk (MD) also.

As a format of recording information onto an optical recording medium, a PWM recording method is available, in which different lengths of marks are formed to have different lengths of spaces (i.e., positions of a front edge and a rear edge of a mark) therebetween so as to carry the information. In this PWM recording method, if pulse conditions such as a strength of a laser pulse and a generation timing of the same are inappropriate when recording, a heat generated at a front portion of the mark might cause a temperature rise at a rear portion of the mark, resulting in a mark shape where the front portion is thin while the rear portion is thick and deformed, or heat generated at the formation of a mark might exert an adverse influence on the formation of an adjacent mark, so that edge positions of marks fluctuate, resulting in a degradation of signal qualities.

The optimum pulse condition significantly depends on the properties of an optical recording medium and a recording/reproducing apparatus. Accordingly, every recording procedure, where an optical recording medium is mounted on a recording/reproducing apparatus and the recording/reproducing apparatus is started, requires a learning operation for determining an optimum pulse condition. This learning operation is to perform test recording while changing a pulse condition and to compare results obtained from the measurement of the qualities of the reproduced signals so as to determine an optimum recording/reproducing condition. According to such a condition, information is recorded on the optical recording medium.

FIGS. 15 and 16 show one example of such a conventional optical recording medium. FIG. 15 is a perspective view showing a conventional optical information recording medium 90, and FIG. 16 is an enlarged plan view showing a track pitch of tracks formed in the conventional optical information recording medium 90.

In FIG. 15, the optical recording medium 90 includes a transparent substrate with a thickness of 1.1 mm, made of polycarbonate, where a central aperture 2 for mounting the same to a recording/reproducing apparatus is formed at its center. On the transparent substrate, a recording layer is formed. On the recording layer, a protective layer with a thickness of 0.1 mm is formed. The recording layer is irradiated with laser light via this protective film, whereby information is recorded/reproduced.

In the transparent substrate, a track 6 is formed so as to track by laser light during recording and reproducing. In the transparent substrate provided in the optical recording medium 90, a lead-in region 3 exclusively used for reproduction, a test recording region 4 and an information recording region 5 are arranged, where the lead-in region 3 is a region for recording identification information for identifying the optical recording medium 90 with an emboss pit or the like, and the test recording region 4 is a region for performing a learning operation for determining an optimum pulse condition.

With reference to FIG. 16, a track in the test recording region 4 and a track in the information recording region 5 have the same width and space. In addition, a track pitch Tp1 of the tracks formed in the test recording region 4 and a track pitch Tp2 of the tracks formed in the information recording region 5 have the same width.

Meanwhile, a tracking error signal for controlling laser light to track the guide grooves during recording and reproducing is obtained generally by a detecting method called a push-pull method.

FIG. 17 is a block diagram showing the configuration of a conventional recording/reproducing apparatus in which tracking control is carried out by the push-pull method. The recording/reproducing apparatus shown in FIG. 17 includes: a spindle motor 10 for rotating the optical information recording medium 90 mounted thereto; a controller 11; a modulator 12 for modulating data to be recorded on the optical information recording medium 90 into a recording signal; a laser driving circuit 13 for driving a semiconductor laser according to the recording signal; an optical head 14 for focusing laser beams from the semiconductor laser provided therein onto the optical information recording medium 90 to record information and for obtaining a reproduction signal from the light reflected from the optical information recording medium 90; an adding amplifier 15 for outputting a sum signal 15S of electric signals output from photoreceivers 21 and 22 of a photodetector 20 provided in the optical head 14, a binarizing circuit 17 for binarizing the sum signal 15S; a differential amplifier 16 for outputting a difference signal 16S between the electric signals output from the photoreceivers 21 and 22; a data demodulation circuit 18 for demodulating data recorded on the tracks formed in the optical information recording medium 90 according to a binarized sum signal 17S and a tracking control circuit 19 for controlling the optical head 14 so that a laser beam appropriately scans the tracks formed in the optical information recording medium 90 according to the difference signal 16S.

FIG. 18 schematically shows a cross-section of a main portion of the optical information recording medium 90 shown in FIG. 15 along a radial direction of the same and a tracking error signal obtained when a laser beam traverses the track 6 formed in the optical information recording medium 90. In order to carry out the tracking control with stability, it is preferable that this tracking error signal has sufficient amplitude and the fluctuation among the tracks is small. The amplitude of the tracking error signal depends on a width and a depth of the track, a track pitch and a reflectance, where a large amplitude can be obtained with increases in the track pitch and the reflectance.

Recently, improvements in the processing capability of various information equipment have led to increases in the amount of information to be handled. Therefore, a recording medium capable of recording/reproducing a larger amount of information has been demanded. As means for handling the larger amount of information, there are a method in which a track pitch is reduced so as to increase the recording density and a method in which a plurality of recording layers is provided where information is recorded/reproduced onto the respective recording layers from a surface on one side.

However, the reduction in the track pitch for increasing the recording density makes the tracking error signal small, and therefore the tracking error signal becomes susceptible to a change in the reflectance due to the recording of a signal. Accordingly, when test recording is conducted under such a laser pulse condition that an amorphous region becomes extremely large during a learning operation for determining an optimum recording condition, the tracking becomes unstable, thus causing a failure in accessing the track. As a result, problems such as it taking a long time to carry out the learning occur, and moreover a region for the test recording is consumed unnecessarily.

In the case where a track pitch is set large enough to carry out the tracking control with stability even when test recording is carried out under an improper recording condition, the track pitch Tp2 in the information recording region, where the recording is carried out under the optimum recording condition only, also is set larger than required, and therefore a problem of a decrease in the recording capacity occurs.

In the case where information is recorded/reproduced with respect to a plurality of recording layers provided in the optical information recording medium from the surface on one side, the following problems occur. A recording layer located farther away from the laser beam irradiation side is irradiated with an attenuated laser beam due to the passage through recording layers located on the laser beam irradiation side, resulting in a decrease in the amount of the light reflected from the layer located farther away from the laser beam irradiation side. Moreover, in order to enable the recording/reproducing with respect to a recording layer located farther away from the laser beam irradiation side, recording layers located on the laser beam irradiation side have to have a sufficient transmittance, which means that a reflectance thereof has to be decreased. As a result, the tracking error signal becomes small, so that the tracking error signal becomes susceptible to a change in the reflectance due to the recording of a signal. Therefore, as in the above case of narrowing the track pitch, during a learning operation for determining an optimum recording condition, the tracking becomes unstable, which might cause a failure in accessing the track. As a result, problems such as it taking a long time to carry out the learning occur, and moreover a region for the test recording is consumed unnecessarily. In the case where a track pitch is set large enough to carry out the tracking control with stability even when test recording is carried out under an improper recording condition, the track pitch Tp2 in the information recording region, where the recording is carried out under the optimum recording condition only, also is set larger than required, and therefore a problem of a decrease in the recording capacity occurs.

Therefore, with the foregoing in mind, it is an object of the present invention to provide a large-capacity optical information recording medium capable of reliable tracking control during test recording, a recording/reproducing apparatus and a recording/reproducing method for the same and a method for manufacturing an optical information recording medium.

SUMMARY OF THE INVENTION

An optical information recording medium according to the present invention includes: a substantially disk-shaped substrate; and a recording layer formed on a surface of the substrate for recording, reproducing and erasing information by irradiation with a laser beam. A test recording region for test recording and an information recording region for recording the information at least are arranged on the surface of the substrate, in the test recording region and the information recording region arranged on the surface of the substrate, a test recording track and an information recording track respectively are formed in a spiral-shaped arrangement or in a concentric arrangement, and a track pitch of the test recording track is wider than a track pitch of the information recording track.

Another optical information recording medium according to the present invention includes: a substantially disk-shaped substrate; a first recording layer formed on a surface of the substrate for recording, reproducing and erasing information by irradiation with a laser beam; a separation layer formed on the first recording layer; and a second recording layer formed on the separation layer for recording, reproducing and erasing information by irradiation with the laser beam. A first test recording region for test recording and a first information recording region for recording the information at least are arranged on the surface of the substrate, in the first test recording region and the first information recording region arranged on the surface of the substrate, a first test recording track and a first information recording track respectively are formed in a spiral-shaped arrangement or in a concentric arrangement. A second test recording region for test recording and a second information recording region for recording the information at least are arranged on the surface of the separation layer. In the second test recording region and the second information recording region arranged on the surface of the separation layer, a second test recording track and a second information recording track respectively are formed in a spiral-shaped arrangement or in a concentric arrangement. A track pitch of the first test recording track is wider than a track pitch of the first information recording track. A track pitch of the second test recording track is wider than a track pitch of the second information recording track.

A recording/reproducing apparatus according to the present invention is for recording, reproducing and erasing information with respect to the optical information recording medium according to the present invention by irradiation with a laser beam, and includes: recording means for recording specific information onto the test recording track formed in the test recording region on a trial basis.

A recording/reproducing apparatus according to the present invention is for recording, reproducing and erasing information with respect to the optical information recording medium according to the present invention by irradiation with a laser beam, and includes: means for, when accessing each recording layer in the recording medium, firstly transferring an optical head to a region having a wider track pitch in the recording layer to be accessed, obtaining a focus of the laser beam into the recording layer so as to follow an information track formed therein, and then adjusting aberration of the laser beam.

A recording/reproducing method is a method for recording, reproducing and erasing information with respect to the optical information recording medium according to the present invention by irradiation with a laser beam, and includes the step of: recording specific information onto the test recording track formed in the test recording region on a trial basis.

A recording/reproducing method according to the present invention is a method for recording, reproducing and erasing information with respect to the optical information recording medium according to the present invention by irradiation with a laser beam, and includes the step of: when accessing each recording layer in the recording medium, firstly transferring an optical head to a region having a wider track pitch in the recording layer to be accessed, obtaining a focus of the laser beam into the recording layer so as to follow an information track formed therein, and then adjusting aberration of the laser beam.

An optical information recording medium manufacturing method is a method for manufacturing the optical information recording medium according to the present invention, and includes the steps of: a track formation step for forming the test recording track and the information recording track in a spiral-shaped arrangement or a concentric arrangement in the test recording region and the information recording region arranged on the surface of the substrate, respectively; and a recording layer formation step for forming the recording layer for recording, reproducing and erasing information by irradiation with a laser beam, on the surface of the substrate with the test recording track and the information recording track formed therein. In the track formation step, the test recording track and the information recording track are each formed so that a track pitch of the test recording track is wider than a track pitch of the information recording track.

An optical information recording medium manufacturing method is a method for manufacturing the optical information recording medium according to the present invention, and includes the steps of: a first track formation step for forming the first test recording track and the first information recording track in a spiral-shaped arrangement or a concentric arrangement in the first test recording region and the first information recording region arranged on the surface of the substrate, respectively; a first recording layer formation step for forming the first recording layer for recording, reproducing and erasing the information by irradiation with a laser beam, on the surface of the substrate with the first test recording track and the first information recording track formed therein, a separation layer formation step for forming the separation layer on the surface of the first recording layer; a second track formation step for forming the second test recording track and the second information recording track in a spiral-shaped arrangement or a concentric arrangement in the second test recording region and the second information recording region arranged on the surface of the separation layer, respectively; and a second recording layer formation step for forming the second recording layer for recording, reproducing and erasing the information by irradiation with the laser beam, on the surface of the separation layer with the second test recording track and the second information recording track formed therein. In the first track formation step, the first test recording track and the first information recording track are each formed so that a track pitch of the first test recording track is wider than a track pitch of the first information recording track. In the second track formation step, the second test recording track and the second information recording track are each formed so that a track pitch of the second test recording track is wider than a track pitch of the second information recording track.

Note here that the statement that a given layer is "formed on" something in this specification refers to a general location and not a specific location. Therefore, between these elements other elements may be interposed.

DETAILED DESCRIPTION OF THE INVENTION

Figure 1A:
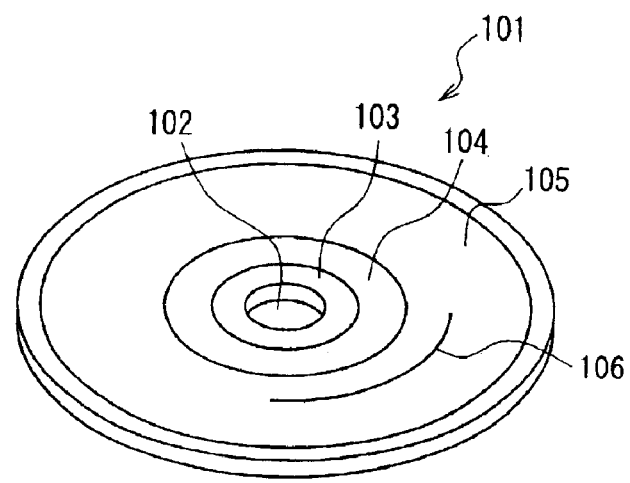
FIG. 1A is a perspective view showing an optical information recording medium according to Embodiment 1.

In an optical information recording medium according to the present embodiments, a track pitch of test recording tracks is set wider than a track pitch of information recording tracks. With this configuration, a larger tracking signal can be obtained in the test recording region than in the information recording region. Therefore, tracking control can be performed with stability even when test recording is conducted under such an improper condition that an amorphous region becomes extremely large during a learning operation for determining an optimum recording condition.

Preferably, the information recording region has a donut-like geometry.

Preferably, the test recording region is arranged inside of the information recording region.

Preferably, the test recording region is arranged outside of the information recording region.

Preferably, the test recording region is arranged adjacent to the information recording region.

Preferably, a guard region having a mirror surface in which no tracks are formed is arranged between the test recording region and the information recording region.

Preferably, the depth and the width of the test recording track are substantially the same as the depth and the width of the information recording track.

Preferably, the cross-sectional shape of the test recording track is substantially the same as the cross-sectional shape of the information recording track.

Preferably, a lead-in region for recording predetermined identification information exclusively used for reproduction further is arranged on the surface of the substrate.

Preferably, in the lead-in region, a lead-in track is formed in a spiral-shaped arrangement or in a concentric arrangement, and a track pitch of the lead-in track has substantially the same width as that of the track pitch of the test recording track.

Preferably, the lead-in region is arranged inside of the information recording region.

Preferably, the lead-in region is arranged inside of the test recording region.

Preferably, the lead-in region is arranged adjacent to the test recording region.

Preferably, the depth and the width of the lead-in track are substantially the same as the depth and the width of the information recording track and the depth and the width of the test recording track.

Preferably, the cross-sectional shape of the lead-in track is substantially the same as the cross-sectional shape of the information recording track and the cross-sectional shape of the test recording track.

In another optical information recording medium according the present embodiments, the track pitch of the first test recording track is wider than the track pitch of the first information recording track, and the track pitch of the second test recording track is wider than the track pitch of the second information recording track. With this configuration, larger tracking signals can be obtained in the first and the second test recording regions than in the first and the second information recording regions, respectively. Therefore, tracking control can be performed with stability even when test recording is conducted under such an improper condition that an amorphous region becomes extremely large during a learning operation for determining an optimum recording condition.

Preferably, the track pitch of the first test recording track and the track pitch of the second test recording track have the same width, and the track pitch of the first information recording track and the track pitch of the second information recording track have the same width.

Preferably, the first test recording track and the first information recording track are arranged in a spiral manner, and the second test recording track and the second information recording track are arranged in a spiral manner.

Preferably, a spiral direction of the first test recording track and the first information recording track is opposite to a spiral direction of the second test recording track and the second information recording track.

Preferably, a lead-in region for recording predetermined identification information exclusively used for reproduction further is arranged on the surface of at least one of the substrate and the separation layer.

Preferably, in the lead-in region, a lead-in track is formed in a spiral-shaped arrangement or in a concentric arrangement, and a track pitch of the lead-in track has substantially the same width as that of the track pitch of the first and the second test recording tracks.

Preferably, the lead-in region is arranged inside of the first and the second information recording regions.

Preferably, the lead-in region is arranged inside of the first and the second test recording regions.

Preferably, the lead-in region is arranged adjacent to the first and the second test recording regions.

Preferably, the depth and the width of the lead-in track are substantially the same as the depth and the width of the first and the second information recording tracks and the depth and the width of the first and the second test recording tracks.

Preferably, the cross-sectional shape of the lead-in track is substantially the same as the cross-sectional shape of the first and the second information recording tracks and the cross-sectional shape of the first and the second test recording tracks.

In a recording/reproducing apparatus according to the present embodiments, specific information is recorded onto the test recording track formed in the test recording region in the optical information recording medium according to the present invention on a trial basis. With this configuration, a larger tracking signal can be obtained in the test recording region than in the information recording region. Therefore, tracking control can be performed with stability even when test recording is conducted under such an improper condition that an amorphous region becomes extremely large during a learning operation for determining an optimum recording condition.

In another recording/reproducing apparatus according to the present embodiments, firstly an optical head is transferred to a region having a wider track pitch in the recording layer to be accessed, a focus of the laser beam is obtained into the recording layer so as to follow an information track formed therein, and then aberration of the laser beam is adjusted. With this configuration, a larger tracking signal can be obtained in the test recording region having a wider track pitch than in the information recording region. Therefore, tracking control can be performed with stability even when test recording is conducted under such an improper condition that an amorphous region becomes extremely large during a learning operation for determining an optimum recording condition.

The following describes embodiments of the present invention, with reference to the drawings.

Embodiment 1

Figure 1B:
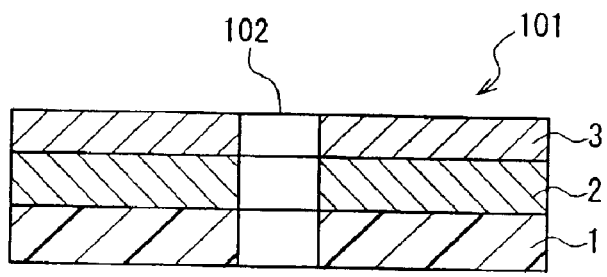
FIG. 1B is a cross-sectional view of the same.
Figure 2:
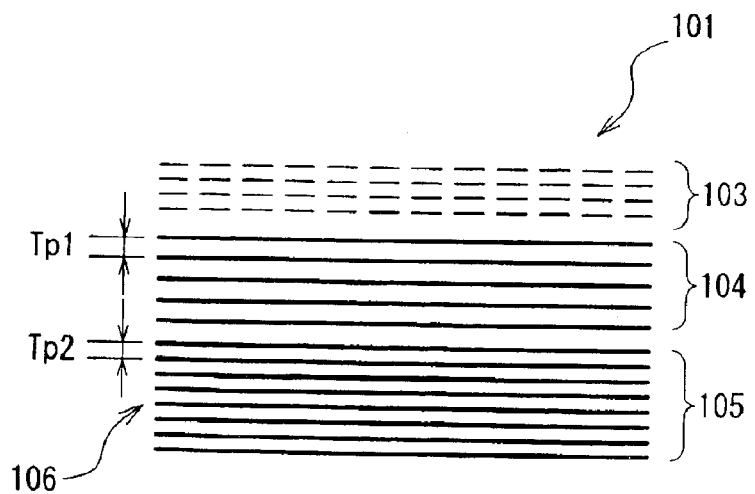
FIG. 2 is an exploded plan view explaining a track pitch of tracks formed in the optical information recording medium according to Embodiment 1.

FIG. 1A is a perspective view showing an optical information recording medium 101 according to Embodiment 1 of the present invention, and FIG. 1B is a cross-sectional view of the same. FIG. 2 is an exploded plan view explaining a track pitch of tracks formed in the optical information recording medium 101.

According to the optical information recording medium 101 of Embodiment 1, information is recorded and reproduced by irradiating with a laser beam with a wavelength of approximately 405 nm that is collected mainly by an objective lens with a NA (numerical aperture) of approximately 0.85.

Now, with reference to FIGS. 1A and 1B, the optical information recording medium 101 may include a transparent substrate 1 measuring 120 mm in diameter and 1.1 mm in thickness, made of polycarbonate, in which a central aperture 102 with a diameter of 15 mm for mounting the same to a recording/reproducing apparatus is formed at its center. On the transparent substrate 1, a recording layer 2 is formed. On the recording layer 2, a protective layer 3 with a thickness of 0.1 mm is formed.

By irradiating with a laser beam through this protective layer 3, information is recorded/reproduced. The recording layer 2 may be made of a GeSbTe alloy as a phase change recording material, and therefore a recording mark is formed by changing the recording layer 2 partially to amorphous by irradiating with a laser beam.

In the transparent substrate 1 provided in the optical information recording medium 101, a lead-in region 103 exclusively used for reproduction is arranged like a donut-shape at a position from a radius of approximately 22 to 23 mm, in which identification information for identifying the optical information recording medium 101 is recorded with emboss pits.

Outside of the lead-in region 103, a test recording region 104 for carrying out a learning operation for determining an optimum pulse condition is arranged at a position from a radius of approximately 23 to 24 mm. Outside of the test recording region 104, an information recording region 105 for recording information is arranged at a position from a radius of approximately 24 to 58 mm. The test recording region 104 and the information recording region 105 are configured with grooves with a depth of approximately 20 nm and a width of approximately 0.2 $\mu$m, thus forming a track 106 for tracking by a laser beam during recording and reproducing.

With reference to FIG. 2, the track pitch Tp2 of the tracks 106 formed in the information recording region 105 arranged in the transparent substrate 1 provided in the optical information recording medium 101 is set at 0.32 $\mu$m. The track pitch Tp1 of the tracks 106 formed in the test recording region 104 is set at 0.35 $\mu$m, which is wider than the 0.32 $\mu$m track pitch Tp2 of the tracks 106 formed in the information recording region 105. The width and depth of the tracks 106 formed in the test recording region 104 may be the same as those of the tracks 106 formed in the information recording region 105.

By making the track pitch Tp1 in the test recording region 104 wider than the track pitch Tp2 in the information recording region 105 as stated above, a larger tracking error signal can be obtained in the test recording region 104 than in the information recording region 105.

Preferably, the track pitch Tp1 of the tracks 106 formed in the test recording region 104 is set wider than the track pitch Tp2 of the tracks 106 formed in the information recording region 105 so that a tracking error signal larger by approximately 20% or more can be obtained in the test recording region 104 than in the information recording region 105, and preferably the track pitch Tp1 is wider than the track pitch Tp2 by approximately 3% or more.

By making the track pitch Tp1 in the test recording region 104 wider than the track pitch Tp2 in the information recording region 105 by approximately 10%, a tracking error signal in the test recording region 104 approximately 1.7 times as large as that in the information recording region 105 can be obtained.

In this way, according to the optical information recording medium 101 of Embodiment 1, tracking control can be performed with stability even when test recording is conducted under such an improper condition that an amorphous region becomes extremely large during a learning operation for determining an optimum recording condition. Therefore, this configuration can eliminate the necessity of setting the track pitch Tp2 of the tracks 106 formed in the information recording region 105 wider than required, in which information is recorded merely under the optimum recording condition. That is to say, the recording capacity of the optical information recording medium 101 can be increased by keeping a narrow track pitch Tp2 in the information recording region 105.

Note here that insofar as the width and the depth of the tracks 106 are kept constant, a change in the track pitch does not lead to a substantial change in the relationship between the recording conditions such as the strength and generation timing of a laser pulse and the shape of the formed amorphous mark. Therefore, the optimum recording condition determined as for the test recording region 104 whose track pitch is relatively wide is applicable to the information recording region 105.

A boundary between the test recording region 104 and the information recording region 105 may be configured with a mirror surface region as a guard region in which no tracks are formed, or may be configured as a region in which a track pitch is changing continuously.

As stated above, according to Embodiment 1, the track pitch Tp1 of the tracks 106 formed in the test recording region 104 is wider than the track pitch Tp2 of the tracks 106 formed in the information recording region 105 Therefore, a larger tracking signal can be obtained in the test recording region 104 than in the information recording region 105. As a result, tracking control can be performed with stability even when test recording is conducted under such an improper condition that an amorphous region becomes extremely large during a learning operation for determining an optimum recording condition.

Embodiment 2

Figure 3:
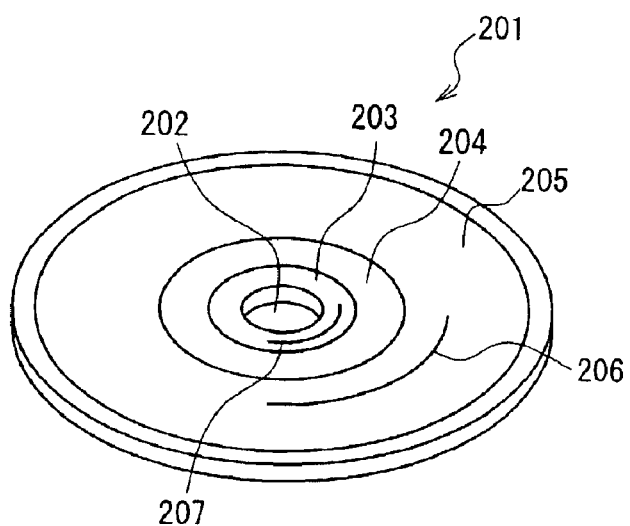
FIG. 3 is a perspective view showing an optical information recording medium according to Embodiment 2.
Figure 4:
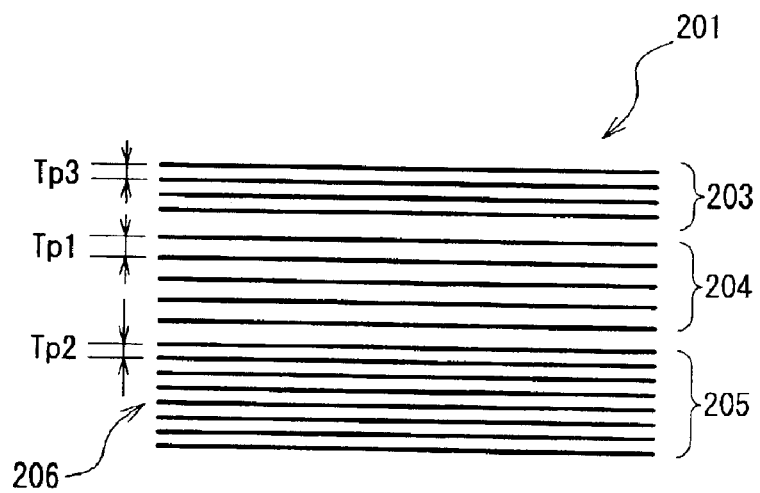
FIG. 4 is an exploded plan view explaining a track pitch of tracks formed in the optical information recording medium according to Embodiment 2.

FIG. 3 is a perspective view showing an optical information recording medium 201 according to Embodiment 2 of the present invention, and FIG. 4 is an exploded plan view explaining a track pitch of tracks formed in the optical information recording medium 201.

The optical information recording medium 201 according to Embodiment 2, in which a lead-in region is configured with guide grooves for tracking by a laser beam and information exclusively used for reproduction such as identification information for the optical information recording medium 201 is recorded on these grooves, has the same configuration as the optical information recording medium 101 of Embodiment 1 described above with reference to FIGS. 1A, 1B and 2, except for a portion thereof.

With reference to FIG. 3, the optical information recording medium 201 has the configuration in which a recording layer may be formed on a transparent substrate measuring 120 mm in diameter and 1.1 mm in thickness, made of polycarbonate, in which a central aperture 202 with a diameter of 15 mm for mounting the same to a recording/reproducing apparatus is formed at its center, and a protective layer with a thickness of 0.1 mm is formed on the recording layer. By irradiating with a laser beam through this protective layer, information is recorded/reproduced. The recording layer may be made of a GeSbTe alloy as a phase change recording material, and therefore a recording mark is formed by changing the recording layer partially to amorphous by irradiating with the laser beam.

In the transparent substrate provided in the optical information recording medium 201, a lead-in region 203 exclusively used for reproduction is arranged at a position from a radius of approximately 22 to 23 mm, in which a medium information track 207 is formed to record identification information for identifying the optical information recording medium 201 and the like. Here, such identification information is recorded by modulating a spatial frequency of wobbling along the radial direction in a groove with a depth of approximately 20 nm and a width of approximately 0.2 μm.

Outside of the lead-in region 203, a test recording region 204 for carrying out a learning operation for determining an optimum pulse condition is arranged at a position from a radius of approximately 23 to 24 mm. Outside of the test recording region 204, an information recording region 205 for recording information is arranged at a position from a radius of approximately 24 to 58 mm. The test recording region 204 and the information recording region 205 are configured with grooves with a depth of approximately 20 nm and a width of approximately 0.2 μm, thus forming a track 206 for tracking by a laser beam during recording and reproducing.

With reference to FIG. 4, the track pitch Tp2 of the tracks 206 formed in the information recording region 205 is set at 0.32 μm. The track pitch Tp1 of the tracks 206 formed in the test recording region 204 is set at 0.35 μm, which is wider than the 0.32 μm track pitch Tp2 in the information recording region 205. The track pitch Tp3 of the medium information tracks 207 formed in the lead-in region 203 may be set at 0.35 μm, which is the same manner as the track pitch Tp1 in the test recording region 204.

In this way, by making the track pitch Tp1 in the test recording region 204 wider than the track pitch Tp2 in the information recording region 205 in the same manner as in the above Embodiment 1, a larger tracking error signal can be obtained in the test recording region 204 than in the information recording region 205.

Figure 5:
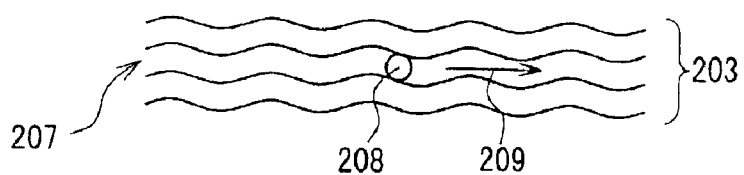
FIG. 5 is a plan view of a main portion of tracks formed in the lead-in region in the optical information recording medium according to Embodiment 2.

FIG. 5 is a plan view of a main portion showing the shape of the medium information track 207 formed in the lead-in region 203. With reference to FIG. 5, a laser beam 208 tracking the medium information track 207 is scanned along the direction indicated by an arrow 209. The medium information track 207 wobbles in the radial direction, and by its spatial frequency important information such as the identification information for the optical information recording medium 201 is recorded. To this end, in order to reduce the crosstalk between adjacent medium information tracks 207 so as to improve a reliability of the reproduced information, the track pitch Tp3 in the lead-in region 203 is set wider than the track pitch Tp2 of the tracks 206 formed in the information recording region 205.

With this configuration of the optical information recording medium 201 of Embodiment 2, tracking control can be performed with stability even when test recording is conducted under such an improper condition that an amorphous region becomes extremely large during a learning operation for determining an optimum recording condition. Therefore, this configuration can eliminate the necessity of setting the track pitch Tp2 of the tracks 206 formed in the information recording region 205 wider than required, in which information is recorded merely under the optimum recording condition. That is to say, the recording capacity can be increased by keeping a narrow track pitch Tp2 in the information recording region 205. In addition, by arranging the lead-in region 203 and the test recording region 204 adjacent to each other and by setting the track pitch Tp3 in the lead-in region 203 and the track pitch Tp1 in the test recording region 204 at the same width, the reproduction from the lead-in region 203 and the test recording onto the test recording region 204 can be conducted successively according to the same tracking condition, whereby a recording/reproducing apparatus can be started smoothly.

A boundary region between the test recording region 204 and the information recording region 205 may be configured with a mirror surface region as a guard region in which no tracks are formed, or may be configured as a region in which a track pitch is changing continuously.

The test recording region 204 may be arranged outside of the information recording region 205. Also, by disposing the test recording region 204 on both of the inner and the outer sides of the information recording region 205, the recording properties distributed along the radial direction of the optical information recording medium 201 can be compensated.

In the test recording region 204, the tracks 206 in the information recording region 205 may wobble in the radial direction at a fixed spatial frequency, and on the basis of the signals obtained from this wobbling the rotation of the spindle motor of the recording/reproducing apparatus can be controlled, and address information obtained by conducting frequency-modulation with respect to this wobbling can be recorded on the tracks 206.

Embodiment 3

Figure 6:
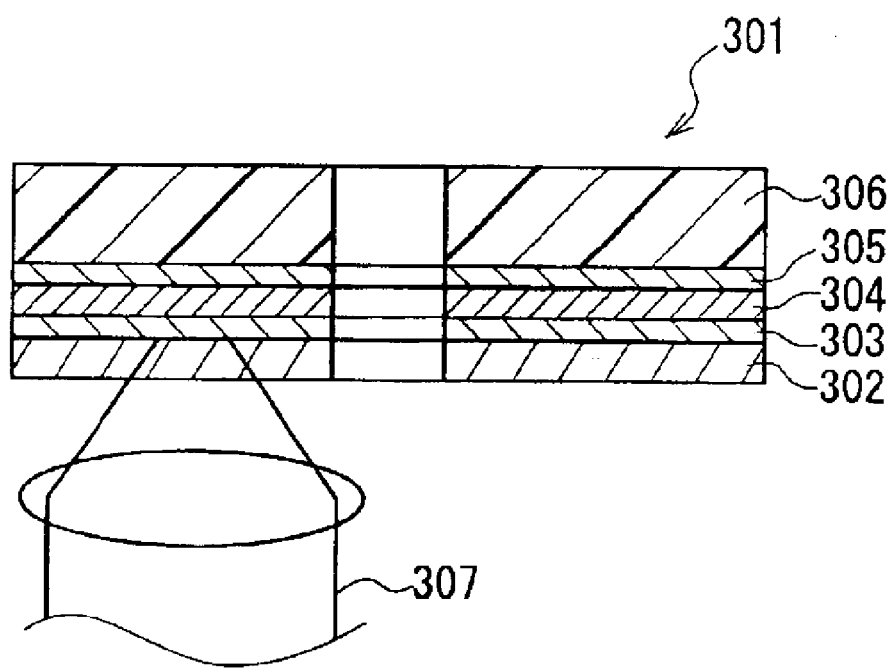
FIG. 6 is a cross-sectional view explaining the configuration of an optical information recording medium according to Embodiment 3.

FIG. 6 is a cross-sectional view explaining the configuration of an optical information recording medium 301 according to Embodiment 3.

The optical information recording medium 301 has a single-sided double-layer structure provided with two recording layers 303 and 305. With this optical information recording medium 301, by irradiating with a laser beam 307 from the side of a protective layer 302 and focusing the laser beam selectively onto either the recording layer 303 or the recording layer 305, information is recorded/reproduced with respect to the two recording layers from the same surface side. The recording layer 303 and the recording layer 305 may be separated from each other by a separation layer 304 with a thickness of approximately 0.03 mm, and these layers 303, 304 and 305 are sandwiched to be held between a substrate 306 with a diameter of 120 mm and a thickness of 1.1 mm and the protective layer 302 with a thickness of 0.07 mm.

In the recording layers 303 and 305, a lead-in region 203, a test recording region 204 and an information recording region 205 for recording information are arranged in the same manner as in Embodiment 2 shown in FIGS. 3 and 4. That is, the lead-in region 203 exclusively used for reproduction is arranged at a position from a radius of approximately 22 to 23 mm, provided with a medium information track 207 to record identification information for the medium by wobbling a groove with a depth of approximately 20 nm and a width of approximately 0.2 $\mu$m along the radial direction so as to modulate its spatial frequency. The test recording region 204 is arranged at a position from a radius of approximately 23 to 24 mm to carry out a learning operation for determining an optimum pulse condition. The test recording region 204 and the information recording region 205 are configured with grooves with a depth of approximately 20 nm and a width of approximately 0.2 $\mu$m, thus forming a track 206 for tracking by a laser beam during recording and reproducing.

The track pitch Tp3 in the lead-in region 203 is set at 0.35 $\mu$m, the track pitch Tp1 in the test recording region 204 is set at 0.35 $\mu$m and the track pitch Tp2 in the information recording region 205 is set at 0.32 $\mu$m. By making the track pitch Tp1 in the test recording region 204 wider than the track pitch Tp2 in the information recording region 205, a larger tracking error signal can be obtained in the test recording region 204 than in the information recording region 205. Therefore, tracking control can be performed with stability even when test recording is conducted under such an improper condition that an amorphous region becomes extremely large during a learning operation for determining an optimum recording condition. Thus, this configuration can eliminate the necessity of setting the track pitch in the information recording region wider than required, in which information is recorded merely under the optimum recording condition. That is to say, the recording capacity of the optical information recording medium can be increased by keeping a narrow track pitch in the information recording region.

In the case of a multilayered recording medium like Embodiment 3 provided with a plurality of recording layers in which information is recorded/reproduced with respect to each of the recording layers from a surface on one side, a recording layer located farther away from the laser beam irradiation side is irradiated with an attenuated laser beam due to the laser beam passing through recording layers located on the laser beam irradiation side, resulting in a decrease in the amount of light reflected from the layer located farther away from the laser beam irradiation side. Therefore, in order to enable the recording/reproducing with respect to the recording layer located farther away from the laser beam irradiation side, recording layers located on the laser beam irradiation side have to have a sufficient transmittance, which means that a reflectance thereof has to be decreased. Since the amplitude of the tracking error signal decreases with decreasing the reflectance, the effect of the present invention is even more significant in the multi-layered recording medium as compared with a medium having a single recording layer.

The lead-in region may be provided in only one of the recording layers, and identification information for the medium may be recorded with emboss pits instead of the use of the medium information track. In addition, track pitches in the recording layer 303 and the recording layer 305 may be different from each other, and the spiral directions of the tracks in these layers may be set opposite to each other. Moreover, three or more recording layers may be provided.

For the present invention, it is important to set the track pitch in the test recording region wider than the track pitch in the information recording region, and therefore the shape of the optical recording media, specific numerical values relating to the position in the radius of the tracks, the depth of the tracks, the width of the grooves and the track pitch can be changed appropriately depending on the performance of the recording/reproducing apparatus to be used and the characteristics of the recording film.

Embodiment 4

Figure 7:
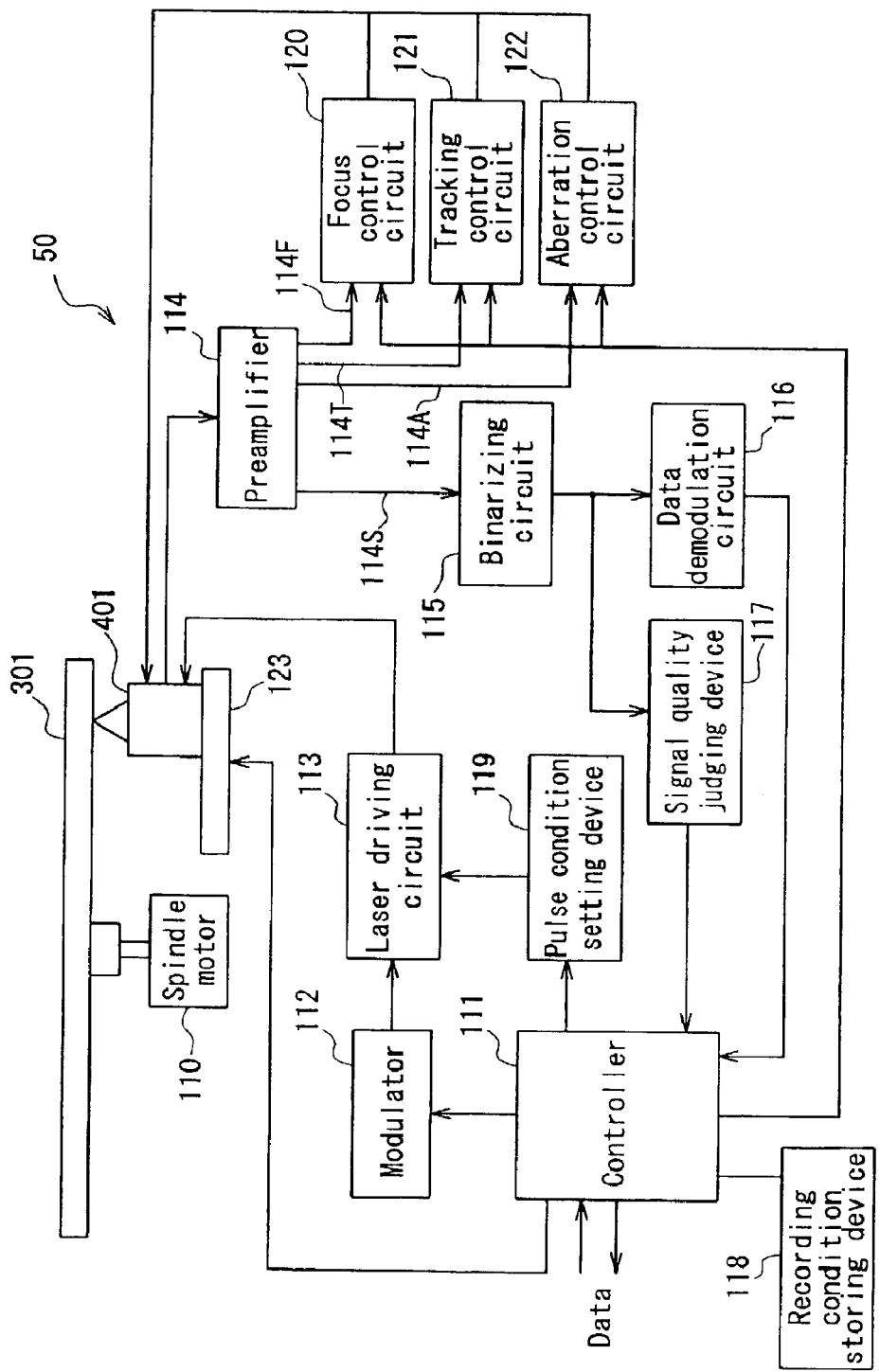
FIG. 7 is a block diagram showing the configuration of a recording/reproducing apparatus according to Embodiment 4.

Embodiment 4 describes a recording/reproducing apparatus and a recording/reproducing method. FIG. 7 is a block diagram showing the configuration of a recording/reproducing apparatus 50 according to Embodiment 4. In the recording/reproducing apparatus 50, the optical recording medium 301 having a plurality of recording layers, which is described in Embodiment 3 with reference to FIG. 6, is mounted. The recording/reproducing apparatus 50 includes an optical head 401.

Figure 8:
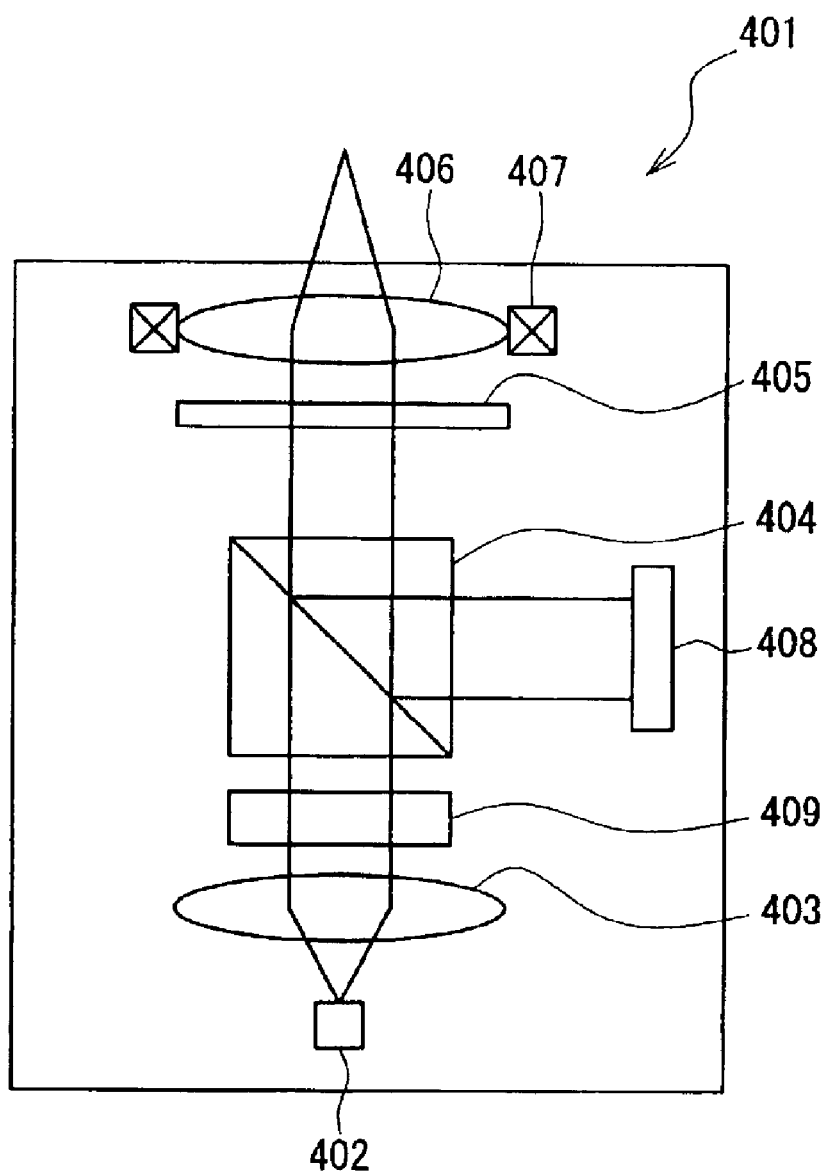
FIG. 8 schematically shows the configuration of an optical head provided in the recording/reproducing apparatus according to Embodiment 4.

FIG. 8 schematically shows the configuration of the optical head 401. The optical head 401 includes a light source 402 made up of a semiconductor laser with a wavelength of 405 nm. A laser beam emitted from the light source 402 passes through a collimator lens 403, a beam path correction device 409 including a lens provided with a movable mechanism, a beam splitter 404, a ¼ wave plate 405 and an objective lens 406 to be focused onto the optical recording medium 301.

The laser beam collected onto the optical recording medium 301 may be focused onto a recording layer as an object that is formed in the optical recording medium 301 by adjusting a position of the objective lens 406 by means of a voice coil 407, and is adjusted so that the aberration of the laser beam is reduced to a minimum by the operation of the beam path correction device 409. A laser beam reflected from the recording layer passes through the objective lens 406 and the ¼ wave plate 405 again, and is reflected from the beam splitter 404 to be fed into a detector 408, so as to be converted into an electric signal.

The recording/reproducing apparatus 50 shown in FIG. 7 includes: a spindle motor 110 for rotating the optical recording medium 301 mounted thereto; a controller 111; a modulator 112 for modulating data to be recorded onto the optical recording medium 301 into a recording signal; a laser driving circuit 113 for driving the light source 402 made up of a semiconductor laser according to the recording signal;, the above-described optical head 401 for focusing a laser beam emitted from the light source 402 onto the optical recording medium 301 to record information and for obtaining a reproduction signal from the light reflected from the optical recording medium 301; a preamplifier 114 for amplifying the reproduction signal to generate an information reproduction signal 114S, a focus error signal 114F, a tracking error signal 114T and an aberration control signal 114A; a binarizing circuit 115 for converting the information reproduction signal 114S into a binary signal; a data demodulation circuit 116 for demodulating data according to the binary signal; a signal quality judging device 117 for judging the quality of a signal that is obtained by reproducing a specific data recorded in the test recording region arranged in the optical recording medium 301 on a trial basis; a recording condition storing device 118 for storing an optimum condition obtained through a learning operation; a pulse condition setting device 119 for controlling a laser pulse according to the recording condition stored in the recording condition storing device 118; a focus control circuit 120 for controlling the optical head 401 according to the focus error signal 114F so that a laser beam can be focused onto a recording layer as an object formed in the optical recording medium 301; a tracking control circuit 121 for controlling the optical head 401 according to the tracking error signal 114T so that a laser beam can scan on a track formed in the optical recording medium 301; and an aberration control circuit 122 for controlling the optical head 401 according to the aberration control signal 114A so that the aberration of the laser beam can be made at a minimum on the recording layer as the object and transfer means 123 for transferring the optical head 401 along the radial direction of the optical recording medium 301.

Figure 17:
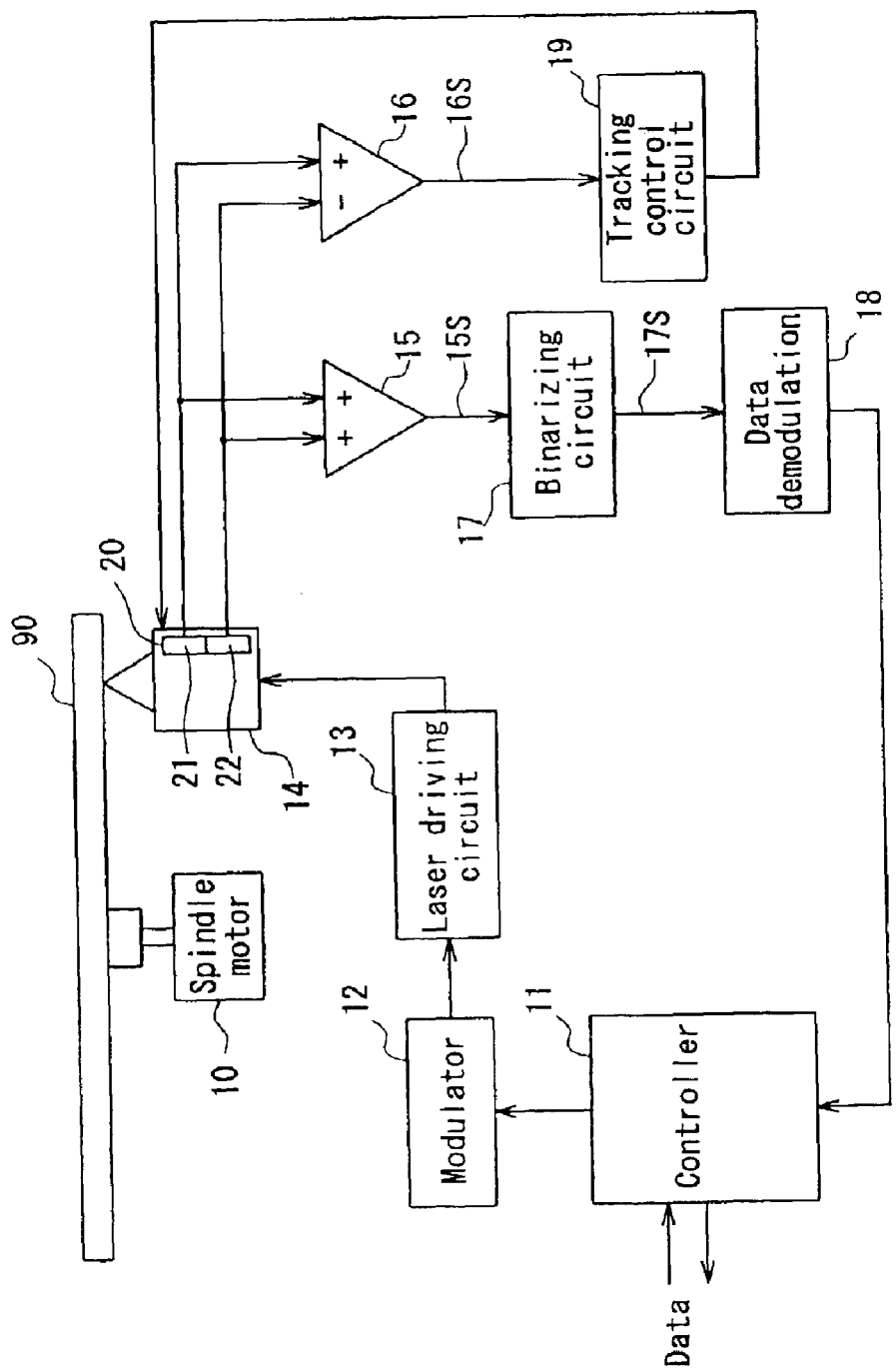
FIG. 17 is a block diagram showing the configuration of a conventional recording/reproducing apparatus.
Figure 18:
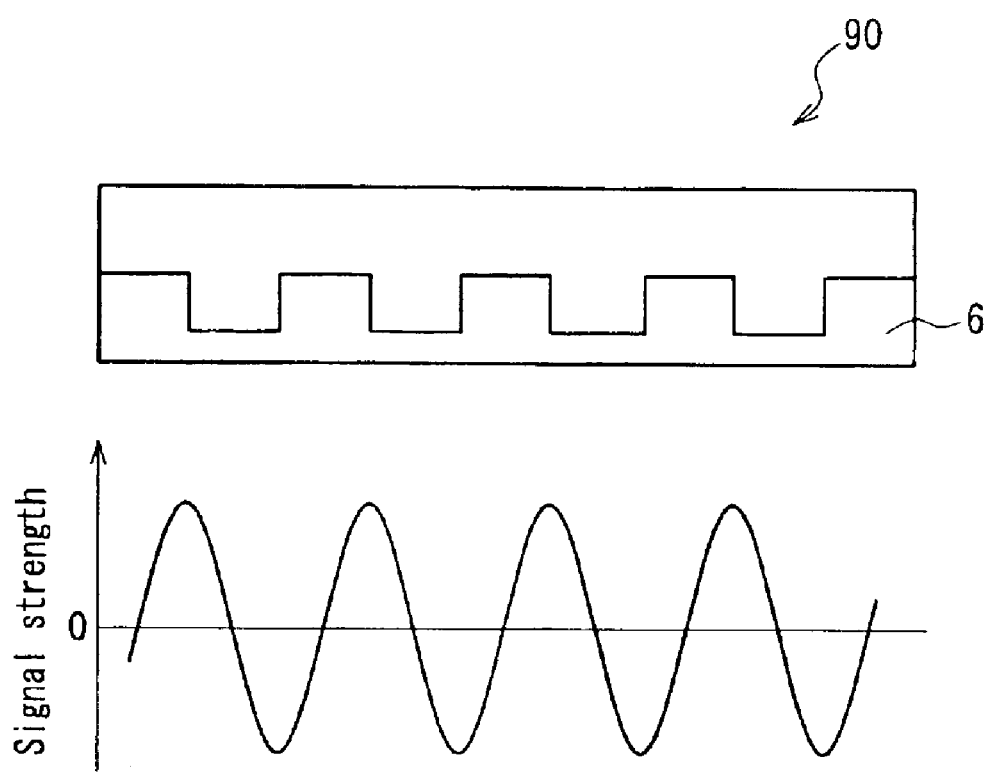
FIG. 18 schematically shows a tracking error signal reproduced from the conventional information recording medium.

Here, the focus error signal 114F is generated according to a general method called an astigmatism method. The tracking error signal 114T is generated according to the push-pull method as described above, with reference to FIGS. 17 and 18. The aberration control signal 114A is generated according to the reproduction signal so that the aberration of the laser beam on the recording layer as the object is reduced to a minimum when the strength of the reproduction signal is the maximum.

Since recording layers in a multilayered recording medium like the optical recording medium 301 have different thickness from the top surface irradiated with a laser beam to the respective recording layers, the focus and the aberration of an irradiated laser beam have to be adjusted optimally for each recording layer to be recorded and reproduced by the recording/reproducing apparatus.

When the recording/reproducing apparatus 50 according to Embodiment 4 accesses each recording layer in the multilayered recording medium like the optical recording medium 301 having a region at a specific radial position in which a track pitch is set wider, firstly, the optical head 401 is transferred to that specific radial position by the transferring means 123, whereby the optical head 401 is placed at the wide track-pitch region in the recording layer as the object, and then the focusing is adjusted, followed by the tracking in a state where the beam path correction device 409 is adjusted roughly according to the predetermined condition.

As for this process, since a strength of a tracking error signal obtained in the narrow track-pitch region is small, the tracking is difficult in a state where the aberration of the laser beam has not been adjusted to a minimum. On the other hand, since a strength of a tracking error signal obtained in the wide track-pitch region is large, the tracking can be carried out with stability in a state where the aberration of the laser beam has been adjusted roughly.

Next, by adjusting the beam path correction device 409 so that the strength of the reproduction signal of the recorded information becomes the maximum, the laser beam can be adjusted so as to reduce the aberration to a minimum.

Therefore, there is no necessity to provide a particular detector for detecting aberration, and information can be recorded and reproduced with respect to the multilayered recording medium by means of the optical head with a simple configuration.

As the aberration control signal, a signal obtained from the wobbling of a track may be used, and by adjusting the beam path correction device 409 so that a strength of the reproduction signal of the recorded information becomes the maximum, the laser beam can be adjusted so as to reduce the aberration to a minimum. The beam path correction device 409 may be configured with a liquid crystal element.

Preferably, in the multilayered recording medium used in the recording/reproducing apparatus 50 according to Embodiment 4, in the case where positions in the multilayered recording medium for switching recording layers can be expected beforehand, even when the positions for switching recording layers are in the region that is not used for the test recording, a track pitch at those positions is set wider than a normal track pitch in the information recording region.

Embodiment 4 describes an example where the optical head 401 is transferred to a predetermined radial position so as to be placed in the wide track-pitch region. However, by recording information indicating the radial position of the wide track-pitch region on the recording medium 301, and by reading out the information and storing the same in the controller 111 when starting the apparatus, the optical head 401 may be transferred according to the information.

Embodiment 5

Figure 9:
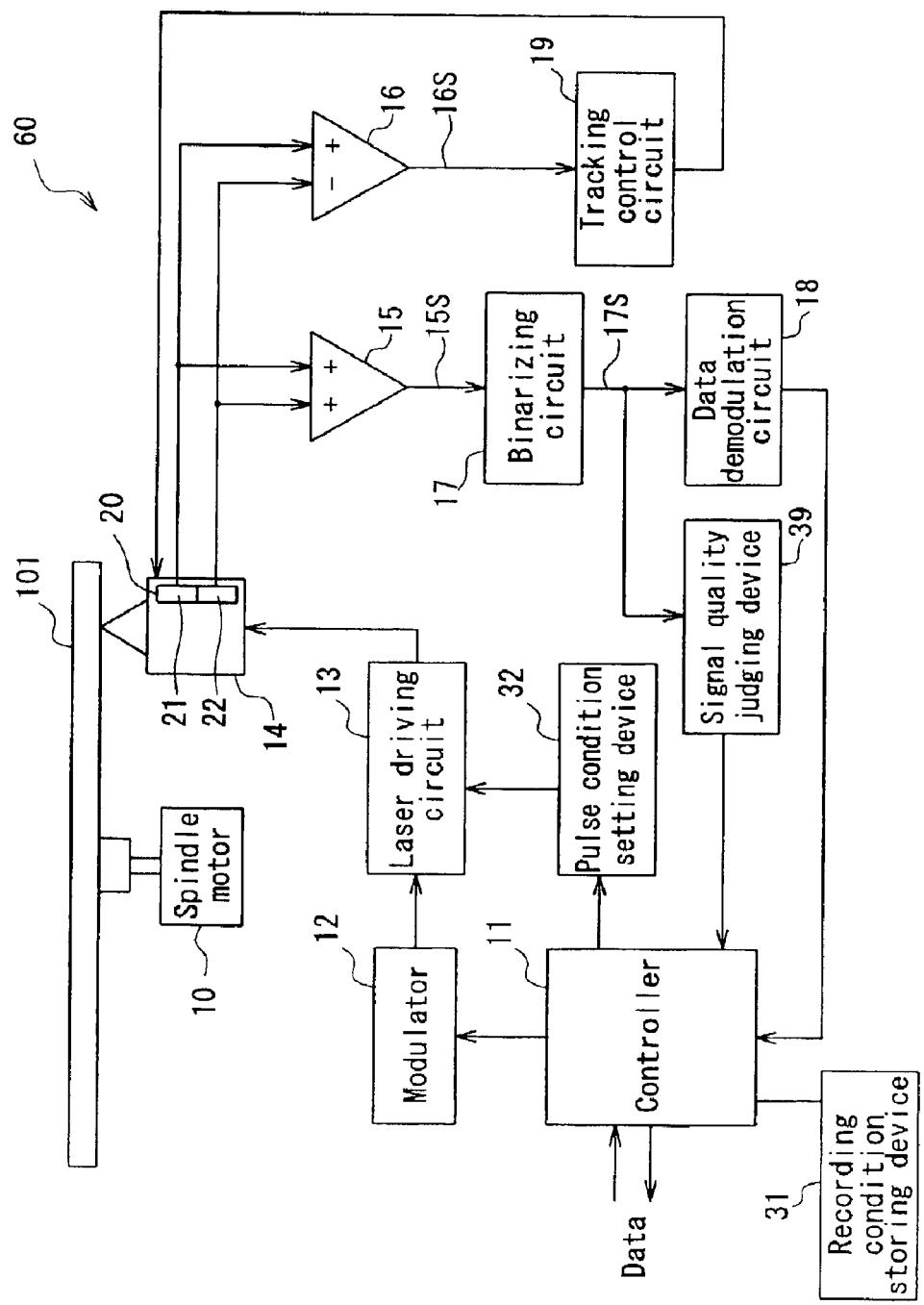
FIG. 9 is a block diagram showing the configuration of a recording/reproducing apparatus according to Embodiment 5.

Embodiment 5 describes a method for recording/reproducing information with respect to the optical recording medium according to the present invention. FIG. 9 is a block diagram showing an example of a recording/reproducing apparatus 60 in which the optical recording medium 101 according to the present invention is used, which shows a state of mounting the optical recording medium 101 described above, with reference to FIGS. 1A and 1B.

This recording/reproducing apparatus 60 includes: a spindle motor 10 for rotating the optical recording medium 101 mounted thereto; a controller 11; a modulator 12 for modulating data to be recorded on the optical recording medium 101 into a recording signal; a laser driving circuit 13 for driving a semiconductor laser according to the recording signal; an optical head 14 for focusing a laser beam from the semiconductor laser provided therein onto the optical recording medium 101 to record information and for obtaining a reproduction signal from the light reflected from the optical recording medium 101; an adding amplifier 15 for outputting a sum signal 15S of electric signals output from photoreceivers 21 and 22 of a photodetector 20 provided in the optical head 14; a binarizing circuit 17 for binarizing the sum signal 15S; a differential amplifier 16 for outputting a difference signal 16S between the electric signals output from the photoreceivers 21 and 22; a data demodulation circuit 18 for demodulating data recorded on the tracks formed in the optical recording medium 101 according to the binarized sum signal 17S; a signal quality judging device 39 for judging a quality of a signal that is obtained by reproducing a specific data recorded in the test recording region arranged in the optical recording medium 101 on a trial basis; a recording condition storing device 31 for storing an optimum condition obtained through a learning operation; a pulse condition setting device 32 for controlling a laser pulse according to the recording condition and a tracking control circuit 19 for controlling the optical head 14 according to the difference signal 16S so that a laser beam can scan on a track formed in the optical recording medium 101.

Figure 10:
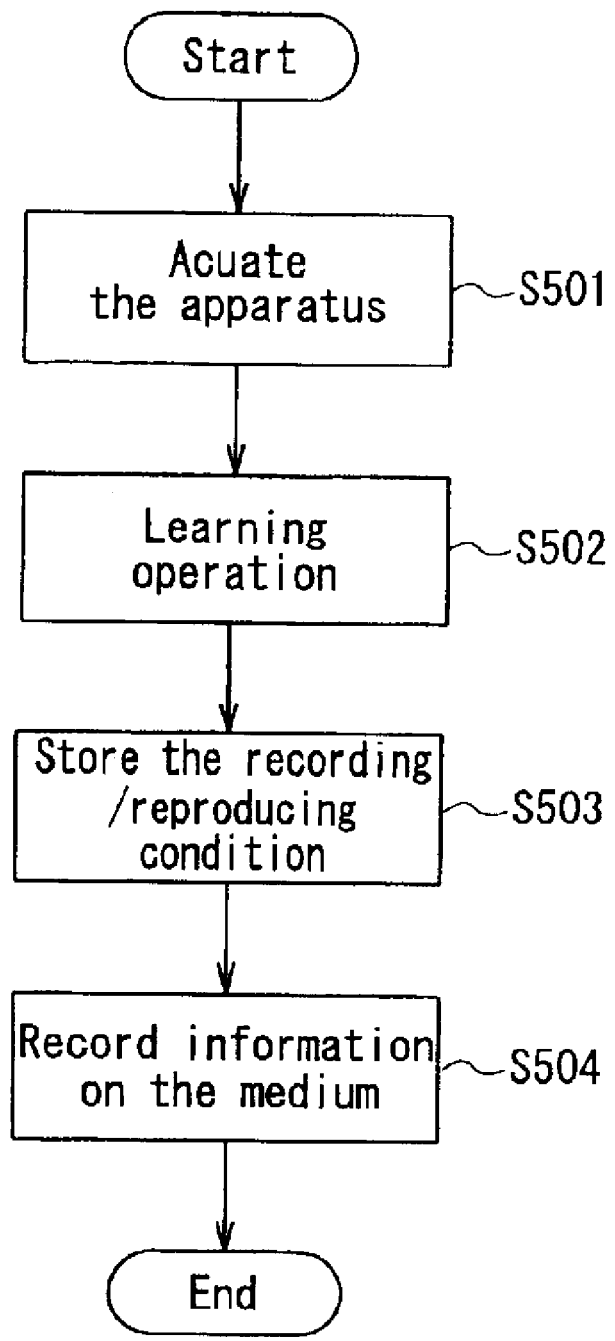
FIG. 10 is a flowchart showing a procedure conducted by the recording/reproducing method according to Embodiment 5.

FIG. 10 is a flowchart showing a recording/reproducing method in which the recording/reproducing apparatus 60 shown in FIG. 9 is used.

Firstly, the recording/reproducing apparatus 60 is actuated (Step S501). More specifically, the optical recording medium 101 is mounted to the spindle motor 10 to be rotated, and then the optical recording medium 101 is irradiated with a laser beam for reproducing information by means of the optical head 14, so as to access the lead-in region 103 arranged in the optical recording medium 101 to read out the identification information for the optical recording medium 101 and the like that is recorded on the lead-in region 103. The reading-out of the identification information and the like is carried out by demodulating the binary signal 17S by the data demodulator 18 and by feeding the same into the controller 11, where the binary signal 17S has been converted by the binarizing circuit 17 for which a predetermined binary slice level has been set.

Next, a learning operation for determining an optimum recording/reproducing condition is carried out (Step S502). This learning operation is carried out to follow the steps below: firstly, the optical head 14 is transferred so as to access the test-recording region 104 having tracks with the same depth and the same width as in the information recording region 105 for recording information but with a track pitch wider than in the information recording region 105. The controller 11 sets the pulse condition setting device 22 to have a predetermined specific condition or a condition designated by the identification information for the optical recording medium 101. Next, the specific data output from the controller 11 is modulated into a laser driving signal by the modulator 12, and the laser driving circuit 13 drives the semiconductor laser provided in the optical head 14 according to the laser driving signal. A laser beam emitted from the semiconductor laser is collected onto the optical recording medium 101 by the optical head 104 to record a test signal in the test recording region 104 arranged in the optical recording medium 101.

The test signal recorded in the test recording region 104 is reproduced to form a reproduction signal, which is converted into a binary signal by the binarizing circuit 17. Then, the amount of jitter (i.e., a variation in the position of the thus reproduced binary signal with reference to the standard clock) is measured by the signal quality judging device 39 to compare the signal with a predetermined criterion to judge the signal quality. If the amount of jitter satisfies the criterion, the learning operation is completed. If the amount of jitter does not satisfy the criterion, the test recording of the specific data and the judgment on the thus recorded test signal are carried out while changing the pulse condition successively. By repeating this process until the amount of jitter satisfies the criterion, an optimum recording condition is determined.

Next, the optimum recording condition obtained through the learning operation in Step S502 is stored in the recording condition storing device 31 (Step S503), and a pulse condition is set according to the optimum recording condition and information is recorded on the information recording region 105 (Step S504).

In this way, by conducting the test recording in the region whose track pitch is set wider than the track pitch in the information recording region for recording information, a larger tracking error signal can be obtained in the test recording than in the information recording.

Therefore, tracking control can be performed with stability even when test recording is conducted under such an improper condition that an amorphous region becomes extremely large during a learning operation for determining an optimum recording condition. Thus, this configuration can eliminate the necessity of setting the track pitch in the information recording region wider than required, in which information is recorded merely under the optimum recording condition. That is to say, the recording capacity of the optical information recording medium 101 can be increased by keeping a narrow track pitch in the information recording region 105 arranged in the optical recording medium 101.

In this embodiment, the optimum recording condition determined by the recording/reproducing apparatus 60 for the first time use of the optical recording medium 101 may be recorded on the optical recording medium 101, and then this optimum recording condition recorded in the recording medium 101 may be read out when the recording medium 101 is used again and may be stored in the recording condition storing device 31 to be used. Thereby, the learning operation can be omitted or reduced, so as not to determine the optimum recording/reproducing condition with every mounting operation of the recording medium 101 to the recording/reproducing apparatus 60 and every starting operation.

Embodiment 6

Embodiment 6 describes a method for manufacturing the optical information recording medium 101 described in the above Embodiment 1, with reference to FIGS. 1A, 1B and 2. FIGS. 11A to 11D are cross-sectional views showing a procedure for manufacturing a master of an optical disk in the method for manufacturing the optical information recording medium 101 according to Embodiment 6.

Figure 11A:
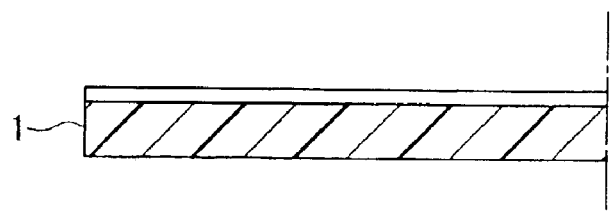
FIGS. 11A to 11D are cross-sectional views showing a procedure for manufacturing a master of an optical disk in a method for manufacturing an optical information recording medium according to Embodiment 6.

With reference to FIG. 11A, firstly, a disk-shaped glass substrate 1 on which a positive photoresist is applied uniformly is prepared.

Figure 11B:
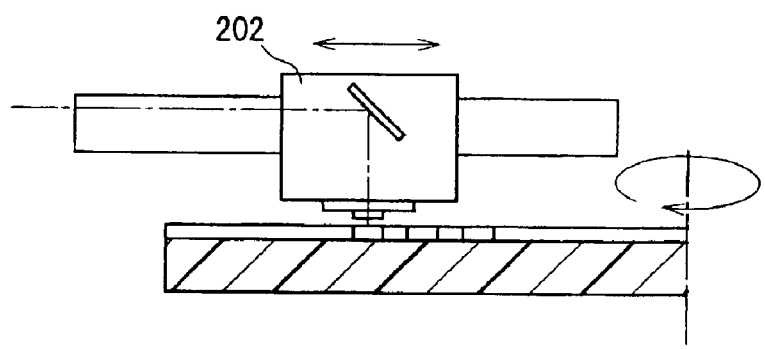
Figure 11C:
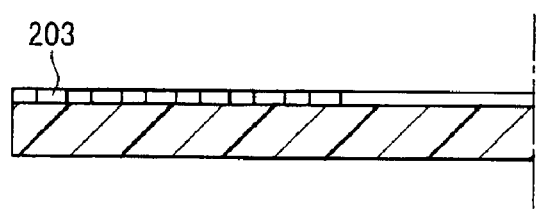
Figure 11D:
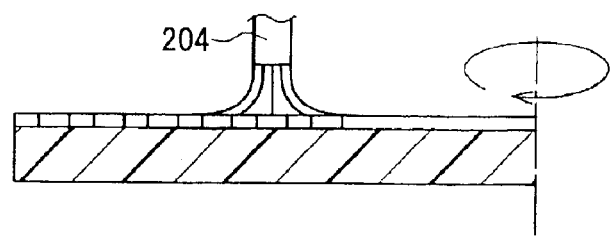

Then, with reference to FIG. 11B, a pre-groove pattern is exposed to light by a laser recording apparatus (LBR) 202 that uses a far ultraviolet (UV) ray laser with a wavelength of 248 nm so that a track pitch Tp1 in the test recording region 104 is wider than a track pitch Tp2 in the information recording region 105.

The laser recording apparatus 202 is equipped with an encoder for detecting the amount of shifting along the radial direction of the glass substrate 1. The laser recording apparatus 202 can calculate the shifting amount using the pulse number detected by the encoder and a predetermined pulse interval. The laser recording apparatus 202 moves according to the predetermined pulse internal and the pulse number detected by the encoder, depending on the track pitch Tp1 in the test recording region 104 and the track pitch Tp2 in the information recording region 105.

The laser recording apparatus 202 exposes the pre-groove pattern to light, so as to correspond to the setting value of the pulse corresponding to the track pitch Tp1 in the test recording region 104. Then, when moving to the information recording region 105, the laser recording apparatus 202 exposes the pre-groove pattern to light by switching into the setting of the pulse corresponding to the track pitch Tp2 in the information recording region 105.

As a result, the pre-groove pattern for the track pitch Tp2 is formed in the information recording region 105, whereas the pre-groove pattern for the track pitch Tp1, which is wider than the track pitch Tp2, is formed in the test recording region 104.

In this way, a latent image 203 for the required groove pattern is formed in the glass substrate 1 as shown in FIG.

1C. Next, with reference to FIG. 11D, a developer is discharged from a developer nozzle 204 while rotating the glass substrate 1 and the latent image 203 formed in the glass substrate 1 is developed.

FIGS. 12A to 12F are cross-sectional views showing a process for manufacturing a stamper in the method for manufacturing the optical information recording medium 101 according to Embodiment 6.

Figure 12A:
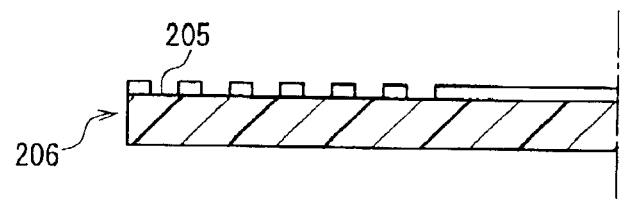
FIGS. 12A to 12F are cross-sectional views showing a process for manufacturing a stamper in the method for manufacturing the optical information recording medium according to Embodiment 6.
Figure 12B:
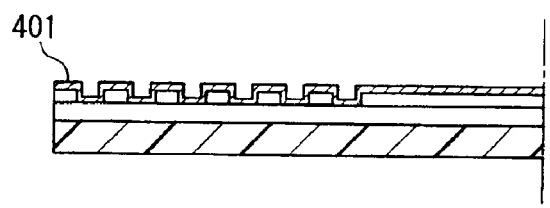
Figure 12C:
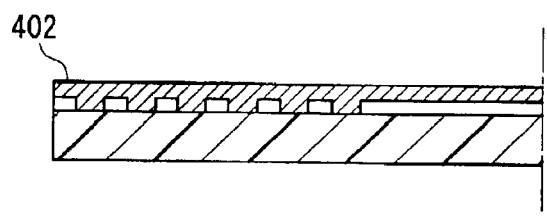
Figure 12D:
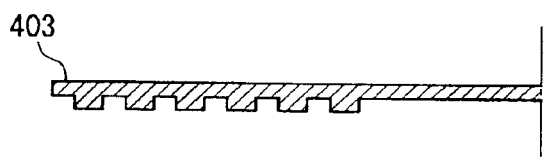

With reference to FIG. 12A, by drying the glass substrate 1 with the developed latent image 203, a disk master 206 is manufactured in which the required groove pattern 205 is formed. Then, with reference to FIG. 12B, a nickel film 401 is formed on the disk master 206 so as to cover the groove pattern 205. Next, with reference to FIG. 12C, nickel plating is conducted where the nickel film 401 functions as an electrode to form a nickel thin plate 402. Then, with reference to FIG. 12D, the nickel thin plate 402 is peeled off from the disk master 206 and the resist is removed to form a nickel thin plate master (father) 403 with a thickness of approximately 0.3 mm, onto which the required groove pattern is transferred.

Figure 12E:
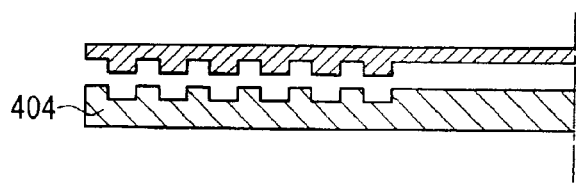
Figure 12F:
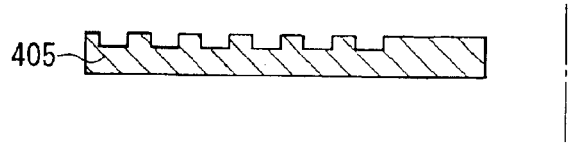

Then with reference to FIG. 12E, nickel plating is conducted again with respect to the father 403 and the nickel plating is peeled off from the father 403 to form a nickel thin plate (mother) 404 with a thickness of approximately 0.3 mm, onto which the required groove pattern formed in the father 403 is transferred. Next, with reference to FIG. 12F, after grinding a rear face of the mother 404, the mother 404 is stamped into a required shape to form a stamper 405 on which the required groove pattern is formed.

FIGS. 13A to 13F are cross-sectional views showing a process for manufacturing the optical information recording medium 101 based on the stamper 405.

Figure 13A:
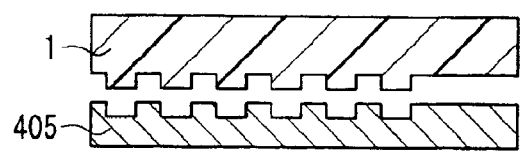
FIGS. 13A to 13F are cross-sectional views showing a process for manufacturing the optical information recording medium based on the stamper, in the method for manufacturing the optical information recording medium according to Embodiment 6.
Figure 13B:
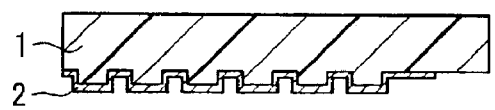

With reference to FIG. 13A, the stamper 405 is attached to an injection molding apparatus which is not illustrated, and the injection-molding is conducted where polycarbonate is used as a material to form a transparent substrate 1 with a thickness of approximately 1.1 mm, onto which the required groove pattern is transferred. Then, with reference to FIG. 13B, a phase-changeable type recording layer 2 containing Ge—Sb—Te as a main component is deposited by sputtering on the surface of the transparent substrate 1 on which the required groove pattern is transferred.

Figure 13C:
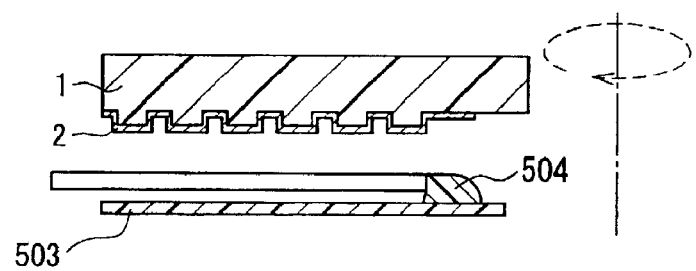

Next, with reference to FIG. 13C, a polycarbonate sheet 503 with a thickness of approximately 90 µm is prepared. Then, a UV curable resin 504 is dropped on the polycarbonate sheet 503 provided on a spin coater. After that, the transparent substrate 1 is superimposed onto the polycarbonate sheet 503 so that the surface of the transparent substrate 1 with the phase-changeable type recording layer 2 formed thereon is opposed to the polycarbonate sheet 503.

Figure 13D:
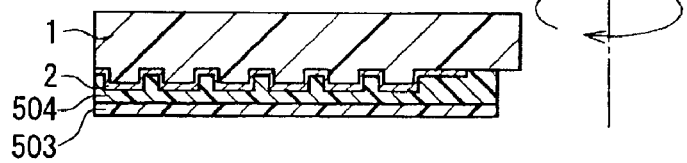
Figure 13E:
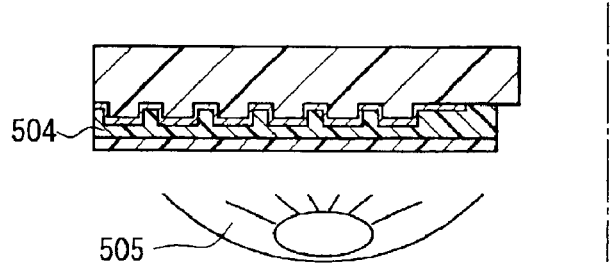
Figure 13F:
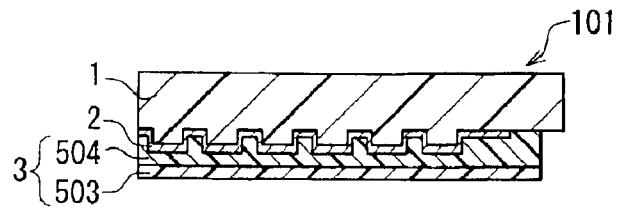

Then with reference to FIG. 13D, the spin coater is rotated so as to spin off a surplus UV curable resin 504 until the thickness of the UV curable resin 504 becomes approximately 10 µm. Next, with reference to FIG. 13E, the UV curable resin 504 is cured by the irradiation with UV light emitted from a UV source 505. With reference to FIG. 13F, the UV curable resin 504 and the polycarbonate sheet 503 make up a protective layer 3. In this way, the optical information recording medium 101 is manufactured.

Figure 14A:
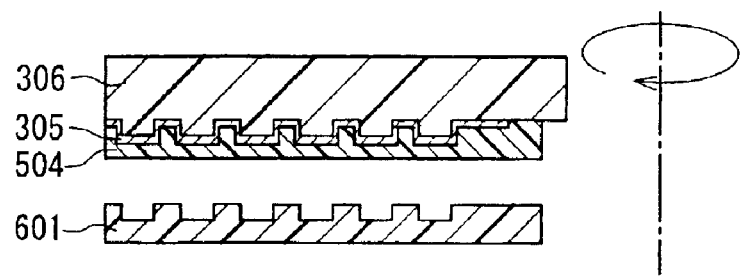
FIGS. 14A to 14C are cross-sectional views showing a process for manufacturing another optical information recording medium based on the stamper, in the method for manufacturing the optical information recording medium according to Embodiment 6.
Figure 14B:
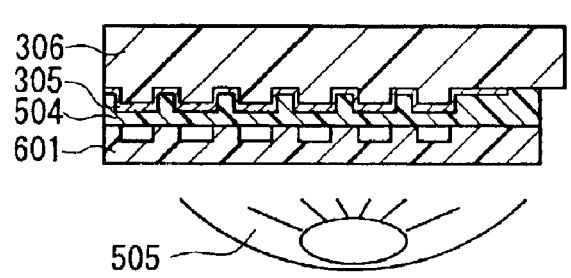
Figure 14C:
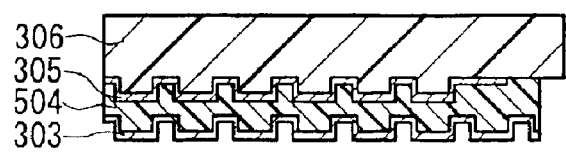
Figure 15:
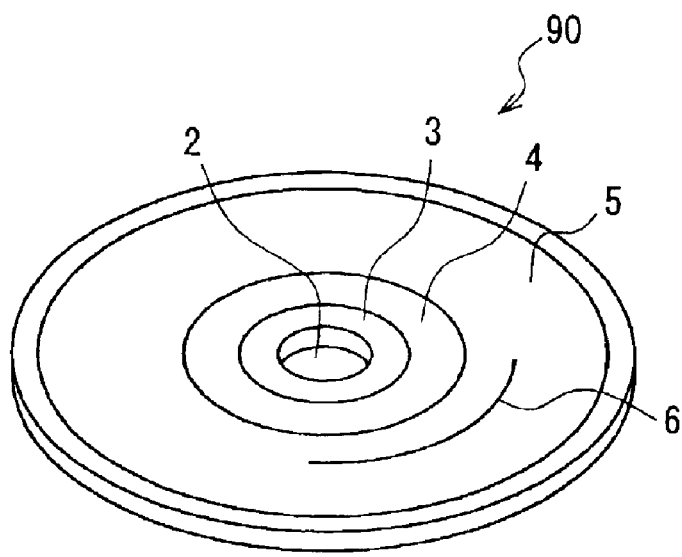
FIG. 15 is a perspective view showing a conventional optical information recording medium.
Figure 16:
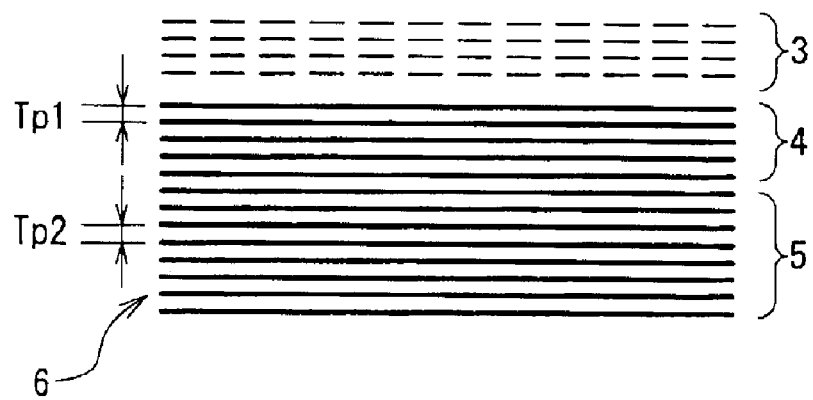
FIG. 16 is an enlarged plan view explaining a track pitch of tracks formed in the conventional optical information recording medium.

FIGS. 14A to 14C are cross-sectional views showing a process for manufacturing the optical information recording medium 301 provided with the two recording layers 303 and 305 described in the above Embodiment 3. With reference to FIG. 14A, firstly, the recording layer 305 is formed on a substrate 306 in the same manner as in the processes described above, with reference to FIGS. 13A and 13B.

Then, after grinding a rear face of a father substrate, which is not illustrated, the injection-molding is conducted using a stamper stamped into a required shape, where polycarbonate is used as a material for the injection-molding to form a transfer substrate 601 on which the required groove pattern is formed. Next, a UV curable resin 504 is applied to the recording layer 305. After that, the transfer substrate 601 is superimposed onto the UV curable resin 504 so that the surface on the required groove pattern is formed is opposed to the UV curable resin 504.

With reference to FIG. 14B, next, the UV curable resin 504 is cured by the irradiation with UV light emitted from a UV source 505 from the side of the transfer substrate 601.

With reference to FIG. 14C, thereafter, the transfer substrate 601 is peeled off from the UV curable resin 504 to form the groove pattern onto the UV curable resin 504. Then, a phase-changeable type recording layer 303 is formed by sputtering. The UV curable resin 504 makes up the separation layer described above with reference to FIG. 6. Next, a protective layer 302 made of polycarbonate is formed according to the same procedure as described above with reference to FIGS. 13C to 13F.

As stated above, according to the present invention, a large-capacity optical information recording medium capable of reliable tracking control during the test recording, a recording/reproducing apparatus and a recording/reproducing method for the same and a method for manufacturing an optical information recording medium can be provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising:
a substantially disk-shaped substrate; and
a recording layer formed on a surface of the substrate for recording, reproducing and erasing information by irradiation with a laser beam,
wherein a test recording region for test recording and an information recording region for recording the information at least are arranged on the surface of the substrate,
in the test recording region and the information recording region arranged on the surface of the substrate, a test recording track and an information recording track respectively are formed in a spiral-shaped arrangement or in a concentric arrangement, and
a track pitch of the test recording track is wider than a track pitch of the information recording track.

2. The optical information recording medium according to claim 1, wherein the information recording region has a donut-like geometry.

3. The optical information recording medium according to claim 1, wherein the test recording region is arranged inside of the information recording region.

4. The optical information recording medium according to claim 1, wherein the test recording region is arranged outside of the information recording region.

5. The optical information recording medium according to claim 1, wherein the test recording region is arranged adjacent to the information recording region.

6. The optical information recording medium according to claim 1, wherein a guard region having a mirror surface in which no tracks are formed is arranged between the test recording region and the information recording region.

7. The optical information recording medium according to claim 1, wherein a depth and a width of the test recording track are substantially the same as a depth and a width of the information recording track.

8. The optical information recording medium according to claim 1, wherein a cross-sectional shape of the test recording track is substantially the same as a cross-sectional shape of the information recording track.

9. The optical information recording medium according to claim 1, wherein a lead-in region for recording predetermined identification information exclusively used for reproduction further is arranged on the surface of the substrate.

10. The optical information recording medium according to claim 9,
wherein in the lead-in region, a lead-in track is formed in a spiral-shaped arrangement or in a concentric arrangement, and
a track pitch of the lead-in track has substantially a same width as that of the track pitch of the test recording track.

11. The optical information recording medium according to claim 9, wherein the lead-in region is arranged inside of the information recording region.

12. The optical information recording medium according to claim 9, wherein the lead-in region is arranged inside of the test recording region.

13. The optical information recording medium according to claim 9, wherein the lead-in region is arranged adjacent to the test recording region.

14. The optical information recording medium according to claim 9, wherein a depth and a width of the lead-in track are substantially the same as a depth and a width of the information recording track and a depth and a width of the test recording track.

15. The optical information recording medium according to claim 9, wherein a cross-sectional shape of the lead-in track is substantially the same as a cross-sectional shape of the information recording track and a cross-sectional shape of the test recording track.

16. An optical information recording medium comprising:
a substantially disk-shaped substrate;
a first recording layer formed on a surface of the substrate for recording, reproducing and erasing information by irradiation with a laser beam;
a separation layer formed on the first recording layer; and
a second recording layer formed on the separation layer for recording, reproducing and erasing information by irradiation with the laser beam;
wherein a first test recording region for test recording and a first information recording region for recording the information at least are arranged on the surface of the substrate,
in the first test recording region and the first information recording region arranged on the surface of the substrate, a first test recording track and a first information recording track respectively are formed in a spiral-shaped arrangement or in a concentric arrangement,
a second test recording region for test recording and a second information recording region for recording the information at least are arranged on the surface of the separation layer,
in the second test recording region and the second information recording region arranged on the surface of the separation layer, a second test recording track and a second information recording track respectively are formed in a spiral-shaped arrangement or in a concentric arrangement,
a track pitch of the first test recording track is wider than a track pitch of the first information recording track, and
a track pitch of the second test recording track is wider than a track pitch of the second information recording track.

17. The optical information recording medium according to claim 16,
wherein the track pitch of the first test recording track and the track pitch of the second test recording track have a same width, and
the track pitch of the first information recording track and the track pitch of the second information recording track have a same width.

18. The optical information recording medium according to claim 16,
wherein the first test recording track and the first information recording track are arranged in a spiral manner, and
the second test recording track and the second information recording track are arranged in a spiral manner.

19. The optical information recording medium according to claim 16,
wherein a spiral direction of the first test recording track and the first information recording track is opposite to a spiral direction of the second test recording track and the second information recording track.

20. The optical information recording medium according to claim 16, wherein a lead-in region for recording predetermined identification information exclusively used for reproduction further is arranged on the surface of at least one of the substrate and the separation layer.

21. The optical information recording medium according to claim 20,
wherein in the lead-in region, a lead-in track is formed in a spiral-shaped arrangement or in a concentric arrangement, and
a track pitch of the lead-in track has substantially a same width as that of the track pitch of the first and the second test recording tracks.

22. The optical information recording medium according to claim 20,
wherein the lead-in region is arranged inside of the first and the second information recording regions.

23. The optical information recording medium according to claim 20,
wherein the lead-in region is arranged inside of the first and the second test recording regions.

24. The optical information recording medium according to claim 20,
wherein the lead-in region is arranged adjacent to the first and the second test recording regions.

25. The optical information recording medium according to claim 20,
wherein a depth and a width of the lead-in track are substantially the same as a depth and a width of the first and the second information recording tracks and a depth and a width of the first and the second test recording tracks.

26. The optical information recording medium according to claim 20, same as a cross-sectional shape of the first and the second information recording tracks and a cross-sectional shape of the first and the second test recording tracks.

27. A recording/reproducing apparatus for recording, reproducing and erasing information with respect to the optical information recording medium according to claim 1 by irradiation with a laser beam, comprising: recording means for recording specific information onto the test recording track formed in the test recording region on a trial basis so that the track pitch of the test recording track is wider than the track pitch of the information recording track.

28. A recording/reproducing apparatus for recording, reproducing and erasing information with respect to the optical information recording medium according to claim 16 by irradiation with a laser beam, comprising: means for, when accessing each recording layer in the recording medium, firstly transferring an optical head to a region having a wider track pitch in the recording layer to be accessed, obtaining a focus of the laser beam into the recording layer so as to follow an information track formed therein, and then adjusting aberration of the laser beam.

29. A recording/reproducing method for recording, reproducing and erasing information with respect to the optical information recording medium according to claim 1 by irradiation with a laser beam, comprising the step of: recording specific information onto the test recording track formed in the test recording region on a trial basis so that the track pitch of the test recording track is wider than the track pitch of the information recording track.

30. A recording/reproducing method for recording, reproducing and erasing information with respect to the optical information recording medium according to claim 16 by irradiation with a laser beam, comprising the step of: when accessing each recording layer in the recording medium, firstly transferring an optical head to a region having a wider track pitch in the recording layer to be accessed, obtaining a focus of the laser beam into the recording layer so as to follow an information track formed therein, and then adjusting aberration of the laser beam.

31. An optical information recording medium manufacturing method for manufacturing the optical information recording medium according to claim 1, comprising the steps of:
   a track formation step for forming the test recording track and the information recording track in a spiral-shaped arrangement or a concentric arrangement in the test recording region and the information recording region arranged on the surface of the substrate, respectively; and
   a recording layer formation step for forming the recording layer for recording, reproducing and erasing information by irradiation with a laser beam, on the surface of the substrate with the test recording track and the information recording track formed therein,
   wherein, in the track formation step, the test recording track and the information recording track are each formed so that a track pitch of the test recording track is wider than a track pitch of the information recording track.

32. An optical information recording medium manufacturing method for manufacturing the optical information recording medium according to claim 16, comprising the steps of:
   a first track formation step for forming the first test recording track and the first information recording track in a spiral-shaped arrangement or a concentric arrangement in the first test recording region and the first information recording region arranged on the surface of the substrate, respectively;
   a first recording layer formation step for forming the first recording layer for recording, reproducing and erasing the information by irradiation with a laser beam, on the surface of the substrate with the first test recording track and the first information recording track formed therein,
   a separation layer formation step for forming the separation layer on the surface of the first recording layer;
   a second track formation step for forming the second test recording track and the second information recording track in a spiral-shaped arrangement or a concentric arrangement in the second test recording region and the second information recording region arranged on the surface of the separation layer, respectively; and
   a second recording layer formation step for forming the second recording layer for recording, reproducing and erasing the information by irradiation with the laser beam, on the surface of the separation layer with the second test recording track and the second information recording track formed therein,
   wherein, in the first track formation step, the first test recording track and the first information recording track are each formed so that a track pitch of the first test recording track is wider than a track pitch of the first information recording track, and
   in the second track formation step, the second test recording track and the second information recording track are each formed so that a track pitch of the second test recording track is wider than a track pitch of the second information recording track.

* * * * *

UNITED STATES PATENT AND TRADEMARK OFFICE
CERTIFICATE OF CORRECTION

PATENT NO. : 6,934,243 B2
DATED : August 23, 2005
INVENTOR(S) : Akiyama et al.

It is certified that error appears in the above-identified patent and that said Letters Patent is hereby corrected as shown below:

Column 23,
Line 2, "according to claim 20, same as" should read -- according to claim 20, wherein a cross-sectional shape of the lead-in track is substantially the same as --.

Signed and Sealed this

Twenty-eighth Day of March, 2006

JON W. DUDAS
*Director of the United States Patent and Trademark Office*